April 16, 1963 R. L. WURGAFT 3,085,672
PEACH-ORIENTATING MACHINE
Filed Oct. 31, 1960 4 Sheets-Sheet 1
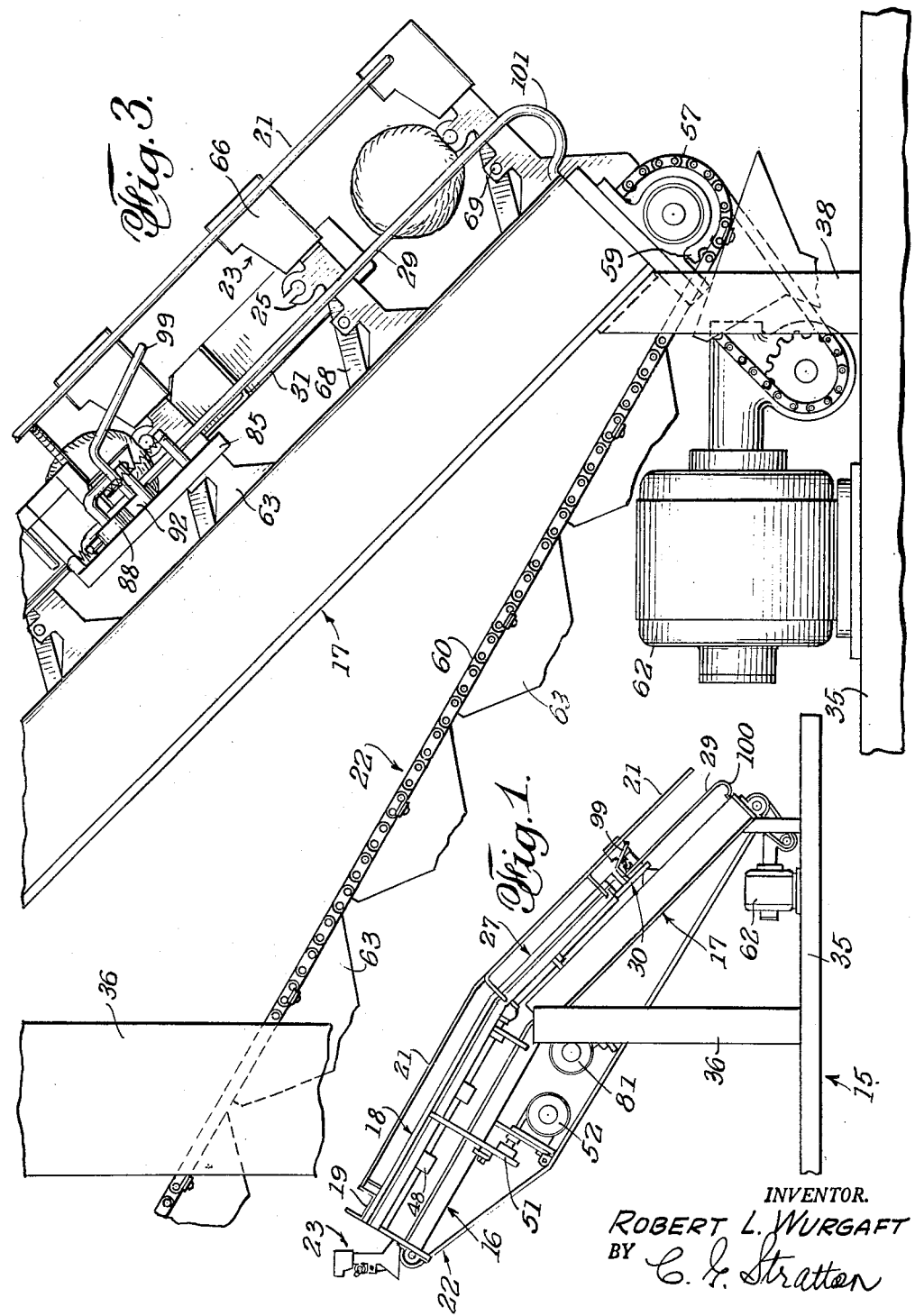
INVENTOR.
ROBERT L. WURGAFT
BY C. L. Stratton
ATTORNEY

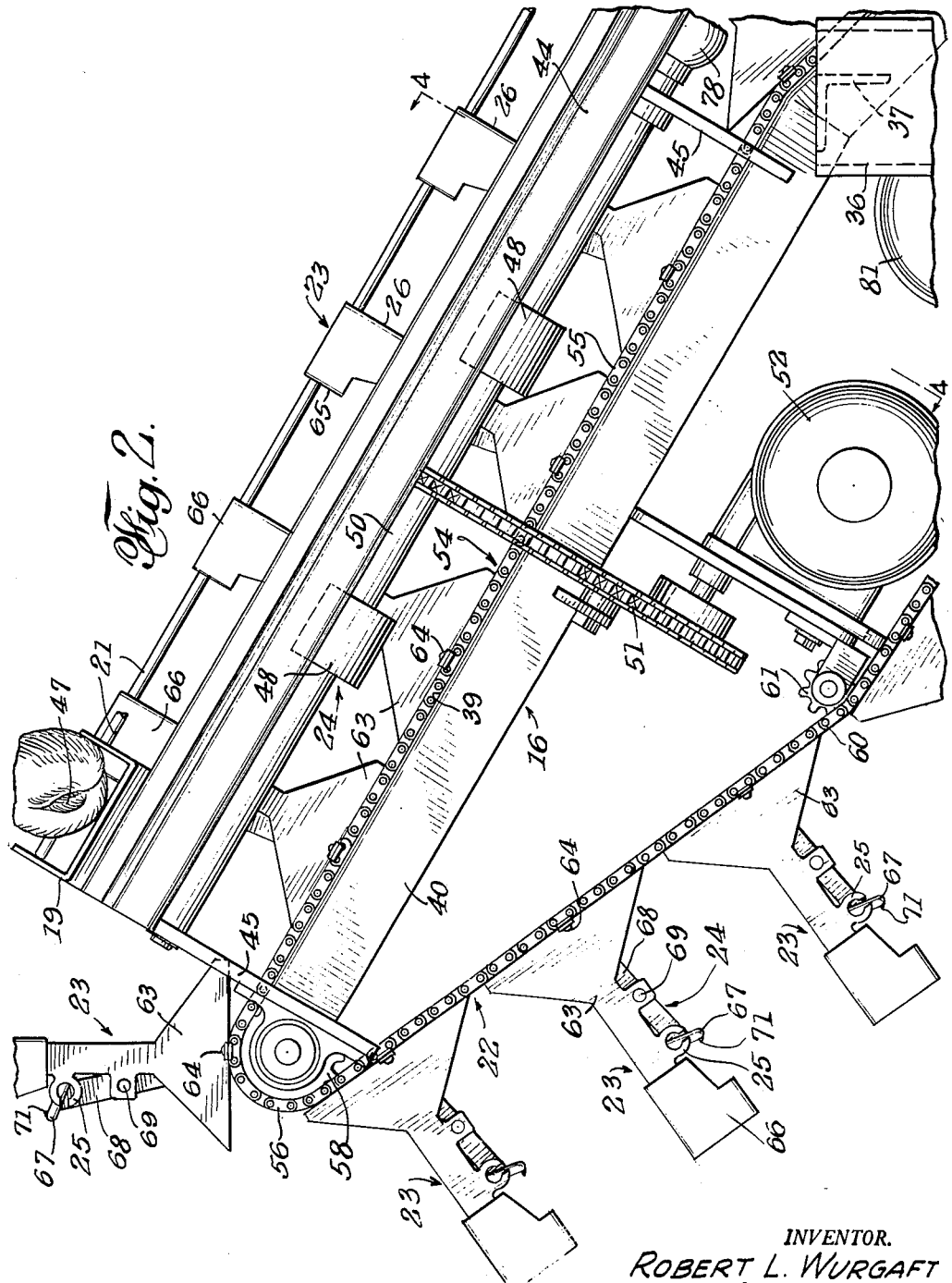

April 16, 1963 R. L. WURGAFT 3,085,672
PEACH-ORIENTATING MACHINE
Filed Oct. 31, 1960 4 Sheets-Sheet 3
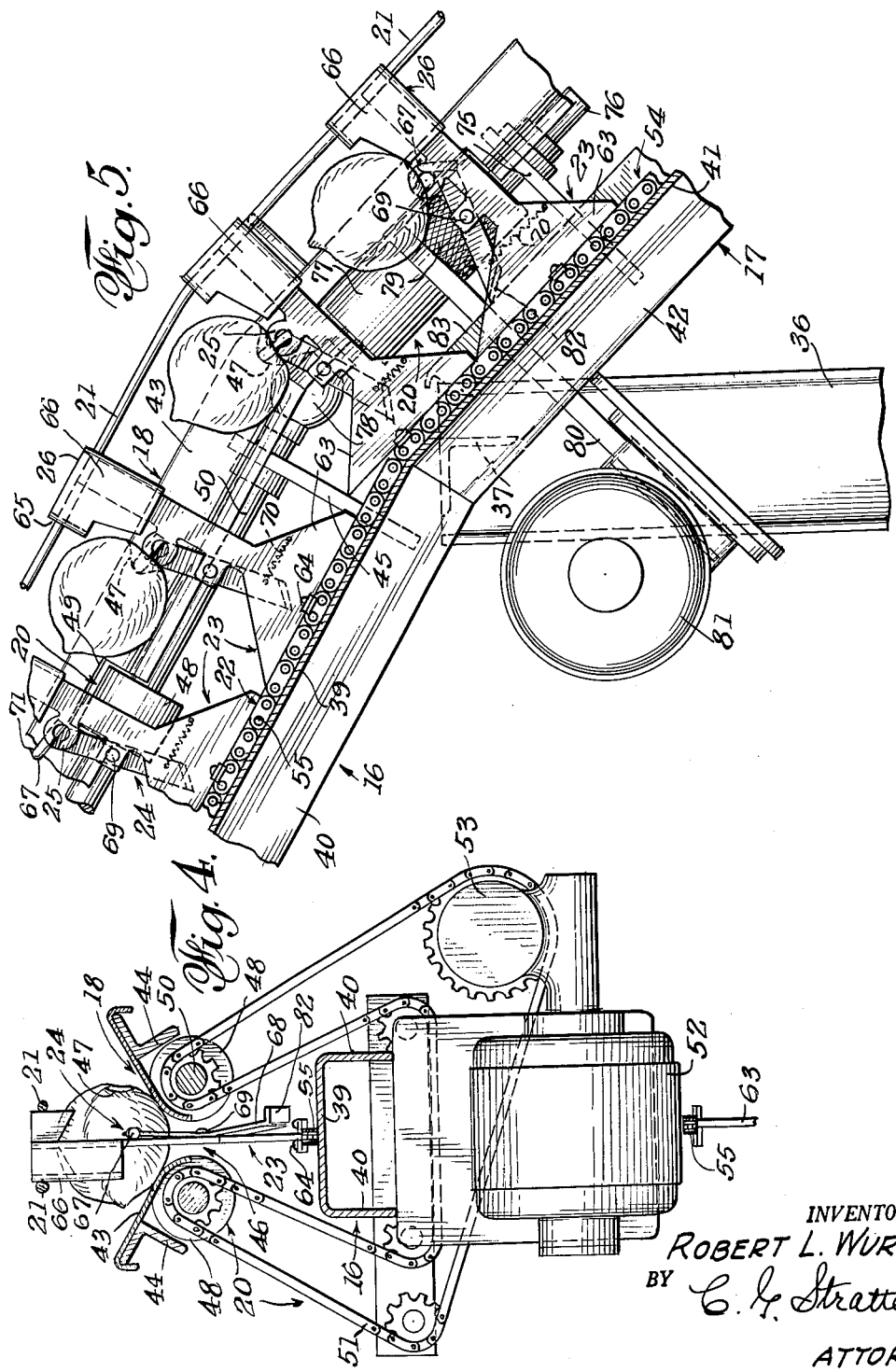
INVENTOR.
ROBERT L. WURGAFT
BY C. G. Stratton
ATTORNEY

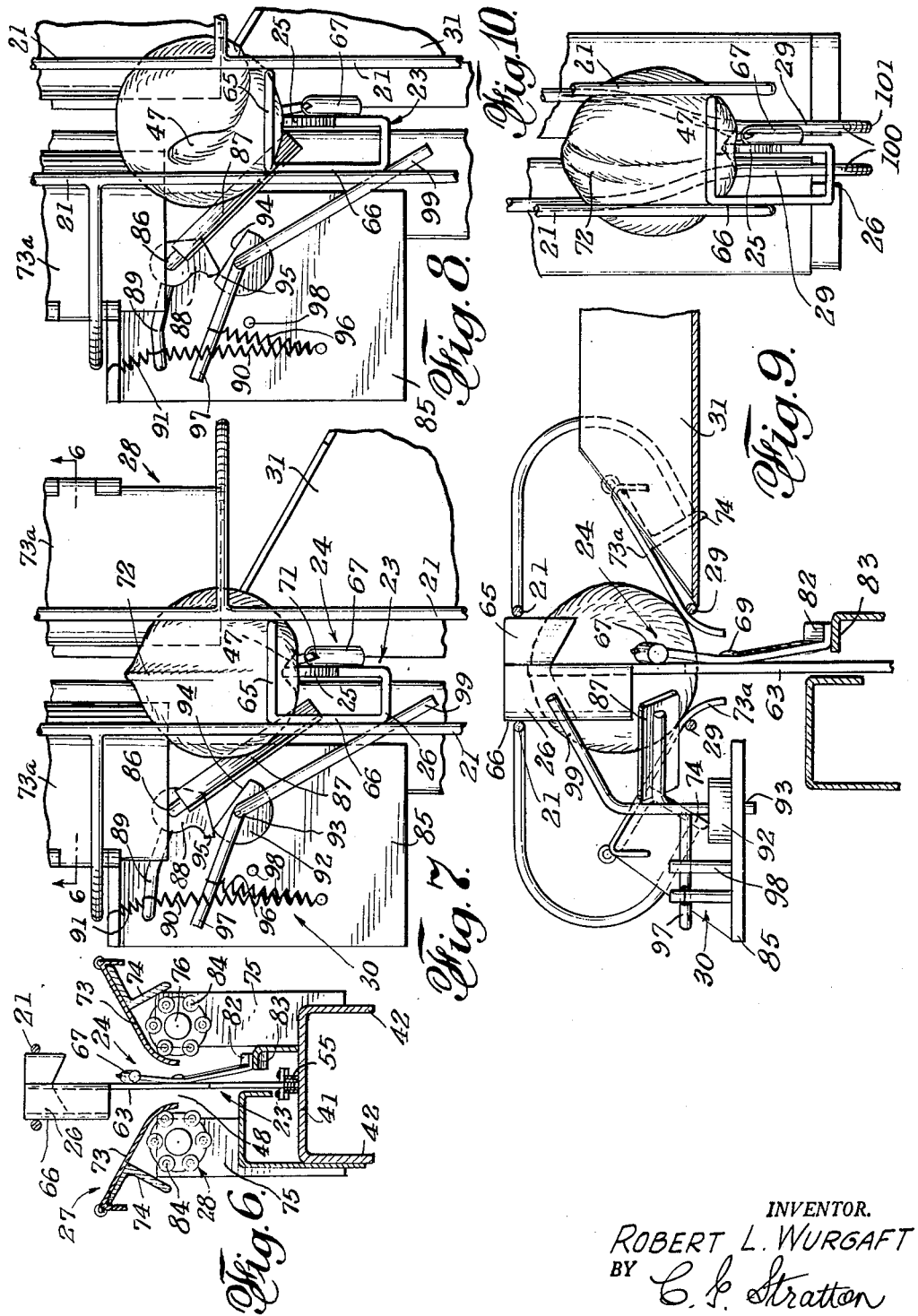

United States Patent Office 3,085,672
Patented Apr. 16, 1963

3,085,672
PEACH-ORIENTATING MACHINE
Robert L. Wurgaft, Anaheim, Calif.
(673 W. Putnam Drive, Whittier, Calif.)
Filed Oct. 31, 1960, Ser. No. 66,261
15 Claims. (Cl. 198—33)

This invention relates to a machine for orientating fruit of the drupe type, particularly peaches, so that the same may be delivered to a halving and pitting machine in such oriented disposition as to enable uniform halving along a plane that extends through and is flatwise of the fruit pit. In this specification and in the claims, the term "peach" is used as including such drupes that have a stem hole of ovoid form that has its longer axis in the same plane as the flatwise plane of the pit, the outer seam of the drupe residing in said plane.

An object of the present invention is to provide a peach-orientating machine that, while a peach is being continuously advanced by a single endless conveyor from a receiving end to a discharge end, orientates the peach by means carried by said conveyor so that its stem hole has a forward position, and then, while retaining the peach so orientated, uses means carried by the conveyor to align the long axis of the stem hole and the seam on one predetermined plane, so that all of the peaches reaching the discharge end of the machine are similarly orientated.

Another object of the invention is to provide a peach-orientating machine, as above indicated, that, while a peach is being transported by the conveyor toward discharge, moves it along a guide trough and revolves it in various directions to enable the stem hole to be engaged by the mentioned means on the conveyor so that orientation may be effected.

A further object of the invention is to provide a peach-orientating machine of the character referred to that ejects peaches that do not achieve the orientated position above mentioned, so that only properly orientated peaches reach the discharge of the machine.

A still further object of the invention is to provide a machine of the character referred to in which rejection is instituted by the peach itself if its position on the conveyor is offset from a properly orientated position.

A yet further object of the invention is to provide a single-conveyor peach-transporting and -orientating machine in which the peaches are moved along a downwardly sloping path toward discharge, and in which the pitch of slope of the path is increased to increase the gravitational force on the peaches after stem hole alignment has been effected to, thereby, insure retention of such alignment during orientation movements of the peach.

A further object of the invention is to provide a peach-orientating machine in which vibration is used to improve efficiency of the orientation movements of the peach while held with the stem hole thereof forwardly aligned.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawings. However, said drawings merely show, and the following description merely describes, one embodiment of the present invention, which is given by way of illustration or example only.

In the drawings, like reference characters designate similar parts in the several views.

FIG. 1, to a small scale, is a side elevational view of a peach-orientating machine according to the present invention some details of the construction being omitted since the same are clearly shown in the other figures.

FIG. 2 is a side elevational view of the peach-receiving and stem hole-aligning portion of the machine.

FIG. 3 is a similar view of the seam-orientating and discharge end of the machine.

FIG. 4 is a cross-sectional view as taken on the line 4—4 of FIG. 2.

FIG. 5 is a longitudinal sectional view of the intermediate portion of the machine, showing the area where the portions of FIG. 2 and FIG. 3 join.

FIG. 6 is a cross-sectional view as taken on the line 6—6 of FIG. 7.

FIG. 7, to a further enlarged scale, is a fragmentary plan view showing peach-ejecting means, shown in non-ejecting position because the peach is in properly orientated position.

FIG. 8 is a similar view of said peach-ejecting means in ejecting position because the peach is not properly orientated.

FIG. 9 is a cross-sectional view as seen at the lower end of FIG. 7.

FIG. 10 is a top view of means for adjusting the position of peaches having unsymmetrical seams.

The peach-orientating machine that is illustrated comprises, generally, a base frame 15, a sloping support frame 16 fixedly mounted on the base frame 15 and extending at an upward angle to one side of the base frame, a sloping support frame 17 that forms a lower continuation of the frame 16 and is at a steeper angle than frame 16, a peach-guiding trough 18, above and parallel to the frame 16, an inlet chute 19 affixed to the upper end of the trough 18 and disposed generally transversely at one side of the trough to deposit peaches into the upper end of the trough 18, means 20 to turn the peaches as they progress downwardly in trough 18, thereby imparting to the peaches both forward rotary motion as they roll down the trough, and transverse rotary movement induced by said means 20, guide means 21 to prevent the peaches, while being so turned, from becoming dislodged from the trough 18, a continuously moving endless conveyor 22 moving over the support frames 16 and 17 and beneath the trough 18, a set of controller units 23 carried by the conveyor and comprising part thereof, each said unit mounting a stem hole-finding and -engaging means 24, embodying an orientating means 25, and provided with a portion 26 that locks the ejector means, an extension trough 27 above and parallel to the support frame 17, means 28 to vibrate a portion of the extension trough 27 to aid orientation movement of the peaches as the same move along the extension trough, means 29 forming an extension of the extension trough and guiding orientated peaches toward the discharge end of the machine, peach-rejecting means 30 to divert non-orientated peaches from the path toward discharge, and a chute 31 to receive such diverted peaches.

The base frame 15 comprises a bottom horizontal portion 35 and a pair of upstanding members 36 that are transversely spaced so that the support frames 16 and 17 may be disposed between them. Transverse angle members 37 rigidly connect said frames 16 and 17 with the upper ends of members 36. Additional rigidity is imparted to the machine by means of braces 38 that connect the bottom portion 35 of the base frame with the lower end of the support frame 17.

The sloping support frame 16 is shown as a channel that has its web 39 arranged on the slope of the frame with the channel flanges 40 depending from the side edges of said web.

The support frame 17 similarly comprises a channel that has a web 41 having flanges 42.

The peach-guiding trough 18 has a V-form in cross-section (FIG. 4) and comprises trough sides 43 that are fixedly held in place by angle members 44. Suitable members 45, wherever needed, connect the frame 16 and the trough 18 in spaced parallel relation with the trough above the frame. As best seen in FIG. 4, the trough sides are spaced apart to provide a passage 46.

The inlet chute 19 is shown as a channel member that has a transverse slope so that peaches may roll therealong and fall gravitationally into the upper end of the trough 18. It will later be seen how the control units 23 allow the peaches to enter the trough, one at a time, spaced by said units as the same are moved by the conveyor.

The slope of the trough 18 is shown at 30° to the horizontal but the same may be on a somewhat greater or lesser slope, or the slope may be adjusted by tilting the machine accordingly to provide for such friction between the surface of the peach and the surfaces of the trough sides 43, that the peaches will have a forward roll rather than merely slide along the trough. In other words, the slope desired for the trough is such that the peaches will roll and yet have a friction with the trough sides that will allow the peaches to slide along the trough if engaged, as by the stem hole-engaging means 24, during transport along and down the slope of the trough 18. It will be clear that at least during sliding movement of the peaches, the same depend on their downward progress by engagement by the units 23.

Merely providing for forward rotation of the peaches, as above, will not insure that the stem holes 47 will readily align with and become impaled in the means 24 to arrest forward rotation of the peaches. The peach rotation must be compounded by providing for transverse rotation thereof, as by the means 20. Said means 20 is shown as rollers 48 that are disposed in openings 49 in the trough sides 43, are tangent to said sides and, because they are rotated on the axes of their shafts 50, turn the peaches transversely as the same progress along the trough 18.

Said means includes a chain and sprocket drive 51 between a motor 52 and the shafts 50, the drive being so arranged that the rollers 48, on opposite sides of the trough, are turned in the same direction, thereby assuring substantial transverse peach rotation. As shown in FIG. 4, a speed reducer 53 on the motor slows the chain movement so that transverse peach rotation is relatively slow, thereby increasing the likelihood of the means 24 finding the stem holes 47. If the impalement of a peach on the means 24 occurs soon after the peach enters the trough, the rotation imparted by the rollers 48 will not affect the impalement, since the peach will merely turn transversely while the same slides along the trough.

The guide means 21 is shown as a wire or wires that are in longitudinal spaced relation above the trough 18, the same serving to keep the units 23 on center during their progress along the machine.

The conveyor 22 is shown as a chain 54 that has a run 55 that travels downward over the top of the webs 39 and 41, and bights 56 and 57 that are trained over sprocket wheels 58 and 59, at the opposite ends of the frames 16 and 17, and a return run 60 that is trained around an idler sprocket or wheel 61 so as to be spaced from the motor 52 and the portions mounting the same beneath the frame 16. Said chain 54, by means of a drive chain to the shaft of sprocket wheel 59, is driven by a geared motor 62 which is here shown as carried by the base portion 35 of the base frame 15.

The units of the set 23 thereof are all alike and are uniformly spaced along and are carried by the chain 54. FIGS. 2 and 3 show exemplary spacing of the units 23 and the latter figure, particularly, shows the peaches disposed on the trough 18 between adjacent units.

Each controller unit 23 comprises a body 63 that is attached, as at 64, to a chain link of the chain 54. Said body is shown as a flat piece of metal that extends from the chain, through the passage 46 in the middle of the trough, and upward to slidingly fit between the guide wires 21, as in FIG. 4. The upper end of said body includes a guide portion 65 and a wall 66 that resides in a plane parallel to the line or path of the trough and of the guide wires 21. Thus, as the chain 55 is driven, said wall 66 slides along one of the guide wires. Said wall 66 comprises a part of the mentioned portion 26 of each unit 23 and also constitutes a member that, as it passes by the discharge end of the inlet chute 19, acts as a cut-off that allows peaches to fall onto the trough 18, one between each pair of adjacent units 23. In other words, the longitudinal extent of wall 66 is such that only one peach will drop onto the trough between two units 23, the next peach to be so released being held up by the wall 66 of the oncoming unit. The portion 65 also prevents peaches from jumping the trough 18 or from rolling around the control units 23.

The stem hole-engaging means 24 of each unit 23 is shown as a rearwardly directed pin-like impaling member 67 that is disposed alongside the flat body 63 and is carried by a lever 68 pivoted to said body at 69, and is spring-biased in a rearward direction by a spring 70, thereby extending in a direction toward a peach in the space between the unit 23 that has said member 67 and the next or oncoming unit 23. Therefore, as can be seen in FIG. 5, the stem hole 47 of such a peach, during the described movements thereof along the trough 18, will most likely find the rearward end of member 67 and so hold the peach against further turnings in a forward direction.

To obviate accidental disengagement of the peach from the member 67, the latter, as shown in FIG. 5, is directed rearwardly upwardly so as to hook into the stem hole by having a greater or firmer connection with the upper portion of the hole-framing parts of the peach than with the lower portion. Also, such connection of peach and member 67 may be improved by the provision of a small prong or barb 71 on the upper rearward portion of member 65, the same, with immaterial marring, hooking into the peach to help move the same along the trough toward discharge.

The orientating means 25 of each unit 23 comprises a rearward flat extension of the flat body 63, the same being immediately alongside the impaling member 67 and slightly forward of the rearward end of said member. Thus, a peach impaled on a member 67 will have its stem hole 47 substantially aligned with the extension 25. At any time that said hole has its long axis aligned or in the plane of the extension 25, the peach will move relatively to said extension and somewhat further onto the member 67 to achieve full entry of said extension into the stem hole. As a consequence, the peach will be held orientated with its seam 72 vertically aligned, i.e., disposed in the plane of the means 25, as is shown in FIG. 7. Since the frictional contact of the peach with the trough sides 43 is a light one, this orientation will be maintained even against rotation by the torques imposed by the rollers 48. In most instances, the orientated position of the peaches may not be achieved until near the lower end of the trough 18, well past the areas of most of such torque applications.

The extension trough 27 is similar to the trough 18 and is comprised of trough sides 73 that are fixedly held in position by angle members 74 and are spaced above the frame 17 by members 75. The passage 48 extends to be between the trough sides 73 so that the control units 23 may travel toward the lower end of the machine.

Said trough, as can be seen in FIGS. 1 and 3 and 5, is substantially steeper than is trough 18. As a consequence, the peaches have lighter frictional engagement with trough sides 73 than they have with trough sides 43, but have firmer connection with the orientating extension 25, because the gravitational force on the peaches has increased due to the steeper angle. An angle of about 45°—some 15° steeper than the angle of trough 18—provides this lessening of friction and increase of orientation retention.

It is not always certain that a peach will achieve orientated engagement with a means 25 before the peach reaches the end of the trough 18. Therefore, the means 20 is partly carried over to the steeper trough 27. As shown in FIG. 5, the shaft 50, on one or both sides of the trough 27, may be provided with an extension 76 on which is carried a roller 77 that has the same purposes as rollers 48. A universal joint 78 connects shafts 50 and 76. To further increase the chances of the peaches becoming orientated on the extensions 25, a knurled roller 79 is provided on the shaft extension 76 but is not affixed thereto. In practice, said roller 79, by means of a belt drive 80, is driven by a geared motor 81 carried by and beneath the support frame 17, as in FIG. 5.

The preferred location of the knurled roller 79 is just beyond where the hole-finding means 24 is retracted, so as to allow the peach to achieve the mentioned full engagement of orientating extension 25 and peach hole 47. As can be seen in FIG. 5, a tail end 82 on the lever 68 encounters a bar 83, that is affixed onto the support frame 16, to cause said lever to become tilted against the bias of spring 70, thereby forwardly retracting the member 67 from within the stem hole 47. If the peach is properly orientated, the same will fall into full oriented connection or engagement with extension 25. If not fully oriented but, nevertheless, aligned with said extension, the knurled roller 79 will turn the peach so that it may achieve full impalement. If the peach hole is otherwise directed, then, of course, the outer surface of the peach will come to rest upon the rearward edge of the extension 25—a condition that is shown in FIG. 8.

It will be clear that FIG. 7 shows a properly oriented peach on an extension 25 and that FIG. 8 shows an unoriented peach. A comparison of the two figures will reveal that the peach in FIG. 7 has a position somewhat more forward relative to the member 23 than has the peach in FIG. 8.

The means 28 helps to true up the orientated position of the peaches. Since drupes, generally, are not fully symmetrical fruits, the seam may become approximately oriented, rather than accurately oriented. Even light frictional resistance to exact alignment of the fruit on the orientating extensions 25 may affect the quality and evenness of the halves. By providing vibration on hinged portions or extensions 73a of trough sides 73, such accurate orientation may be achieved. To this end, vibrator units 84, on the shaft extensions 76, are provided so that they will vibrate said extensions 73a as the shafts 50 are rotated.

The means 29 comprise wire or rod extensions of the trough side extensions 73a, the same being provided as peach-supporting means that offer minimum resistance to sliding movement of the peaches after the same have been fully orientated so that the same may be retained. FIGS. 3 and 9 best show such peach-supporting means along which peaches slide easily and with little tendency to turn.

FIGS. 7, 8 and 9 best show the means 30 for rejecting peaches, as for instance, in the position of FIG. 8, so that the same will not reach the end of the peach-supporting means 29, but rather be diverted to the chute 31.

The means 30 is shown as a base plate 85 that is in fixed position at one side of the trough at the forward end of one of the trough side extensions 73a. On a pivot 86 in said plate, a peach-diverter 87 is mounted so as to extend in an angularly forward direction across the path of movement of the peaches on the support wires 29. It is quite obvious that when a peach encounters said diverter and the same is free to turn on its pivot 86, it will so turn and the peach will retain its position on the support 29 and continue its movement toward the discharge end of said support. If the diverter is locked against pivotal movement, the peach, as it progresses, will become displaced toward the chute 31 and fall onto said chute. The means 30 includes locking means for the diverter 87 which is released or unlocked only by an orientated peach.

A latch 88 is fixed with the diverter and turns therewith on pivot 86. An extension 89 on said latch 88 is biased by a spring 90 in a direction to cause the diverter 87 to assume a position in the path of the peaches. A counterbalancing spring 91 is used to provide the diverter with a light operating resistance and to insure that the diverter will easily swing out of the path of a properly orientated peach without the danger of diverting the same to chute 31.

A lock plate 92, on a pivot 93, has a face 94 that is operatively associated with the toe 95 of the latch 88. Normally, a spring 96, engaged with an arm 97 that is affixed to the plate 92, maintains said arm against a stop 98, thereby holding the plate 92 in such a position that its face 94 is spaced away from the toe 95. Also, an elongated arm 99 that is affixed to the lock plate is so directed as to be in the path of the portions 26 of the control units 23.

As the portion 26 of a unit 23 engages said arm 99, the latter will be swung outwardly by said portion to move the face 94 into the path of outward movement of the toe 95 of the latch 88. If the diverter 87 is moved by a peach to cause said toe 95 to move clear of face 94 before said face is moved by the means 26 to interfere with such movement of the toe 95, the diverter will swing clear and the peach will remain on the support wires 29. Such is the case when the peach is properly engaged with the extension 25 of the unit that controls said face 94, the same being shown in FIG. 7. If the peach is not properly engaged with the orientating extension 25, the peach will be a quarter-inch or more rearward of an orientated position. As a consequence, the means 26 will be able to move face 94 into the path of swinging movement of the toe 95 of latch 88, thereby locking the diverter 87 against outward swinging movement. Hence, said diverter will displace the unorientated peach as the same continues its movement and the peach will fall onto the chute 31.

There are instances when an orientated peach is so unsymmetrical that the seam 72 thereof is overbalanced by the heavier or larger side of the peach to a slightly offset or side location, as indicated in FIG. 10. By forming the support wires 29 at the discharge end of the machine so that the ends 100 are directed toward each other, thus constricting the space between them, the same may engage an offset seam and, by camming the same to a straighter position, correct the overbalanced disposition of the peach to a more balanced position.

The discharge ends of the support wires 29 are rounded over, as at 101, so that the peaches may follow the same as the units engaging them swing around the end bight 57 of the conveyor chain. At that time, the peaches are beyond the ends of the guide wires 21. Therefore, any suitable pickup means may be used to grasp the sides of the peaches and remove the same from the extensions 25. Since all of the peaches thus grasped are in the same orientated position, it is a simple matter to present them to the cutter or cutters of a halving machine so that the peaches are halved on a plane through the seam.

The above describes a machine that orientates drupes, i.e., peaches, in which the stem holes are ordinarily ovoid. It will be realized, of course, that fruits that have stem holes that are more nearly uniform in all directions, as for instance, apples and tomatoes, may be handled by machines modified or adapted to orientate only to have the stem hole forwardly directed as the fruit is being fed toward discharge.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A machine for orientating peaches with the long axes of the stem holes and the seams thereof disposed on a predetermined plane, said machine comprising means affording a path of movement for said peaches toward a discharge end, said means having an upper, downwardly sloping portion and a lower and steeper downwardly sloping portion, means to turn the peaches both forwardly and transversely during movement thereof along the upper portion of the machine, means moving with the peaches along said path and comprising a feeler to find and enter the seam holes of the turning peaches and means to hold the peaches orientated on the mentioned plane after being engaged by the feelers, and means carried by the steeper lower portion of the machine to divert peaches whose seam holes are not engaged by said feeler.

2. A machine according to claim 1 provided with means carried by the steeper sloping portion adjacent to the lower end of the upper portion to turn peaches transversely.

3. A machine according to claim 1 provided with means carried by the steeper sloping portion adjacent to the lower end of the upper portion to turn peaches transversely, and means to turn the peaches transversely oppositely to the turning movement of the latter means.

4. A machine according to claim 3 provided with means to impart vibration to the peaches both before and after the same have achieved orientated position.

5. A machine for orientating peaches with the long axes of the stem holes and the seams thereof disposed on a predetermined plane, said machine comprising means affording a path of movement for said peaches toward a discharge end, said means having an upper, downwardly sloping portion and a lower and steeper downwardly sloping portion, means to turn the peaches both forwardly and transversely during movement thereof along the upper portion of the machine, means moving with the peaches along said path to first find and engage the seam holes of the turning peaches and then hold the same orientated on the mentioned plane, and means carried by the steeper lower portion of the machine to divert unorientated peaches from said path, comprising a first lever contacted by the means moving with the peaches having a lock means and a diverting lever contacted by the moving peaches whereby the difference in spacing of properly and improperly oriented peaches with respect to the means moving with the peaches causes the lock means to lock the diverting lever to thereby divert improperly oriented peaches from said path of movement.

6. A machine for orientating peaches with the long axes of the stem holes and the seams thereof disposed on a predetermined plane, said machine comprising an upper portion provided with an upper inlet chute and disposed at a downward angle from said chute and a lower portion disposed at a steeper angle and terminating in a lower discharge end, endless conveyor means having a run that longitudinally traverses said two portions from end to end, means embodied in the upper machine portion to turn peaches moving therealong both in a forward direction and in a transversely rotational direction, finder means carried by the conveyor to find and engage the stem holes of the peaches during the mentioned turning thereof to hold the peaches with their stem holes forwardly directed and to arrest the forward turning movement of the peaches, and orientating means carried by said conveyor to find and enter the stem holes while the same are occupied by the finder means to hold peaches against all rotation during further progress toward discharge, and means carried by the lower steeper portion to retract the finder means.

7. A machine for orientating peaches with the long axes of the stem holes and the seams thereof disposed on a predetermined plane, said machine comprising an upper portion provided with an upper inlet chute and disposed at a downward angle from said chute and a lower portion disposed at a steeper angle and terminating in a lower discharge end, both the upper portion and the upper part of the lower portion comprising sloping-sided troughs down which the peaches roll, endless conveyor means having a run that longitudinally traverses said two portions from end to end, means embodied in the upper machine portion to turn peaches moving therealong both in a forward direction and in a transversely rotational direction, finder means carried by the conveyor to find and engage the stem holes of the peaches during the mentioned turning thereof to hold the peaches with their stem holes forwardly directed and to arrest the forward turning movement of the peaches, and orientating means carried by said conveyor to find and enter the stem holes while the same are occupied by the finder means to hold peaches against all rotation during further progress toward discharge, and means carried by the lower steeper portion to retract the finder means.

8. A machine for orientating peaches with the long axes of the stem holes and the seams thereof disposed on a predetermined plane, said machine comprising an upper portion provided with an upper inlet chute and disposed at a downward angle from said chute and a lower portion disposed at a steeper angle and terminating in a lower discharge end, both the upper portion and the upper part of the lower portion comprising sloping-sided troughs down which the peaches roll, endless conveyor means having a run that longitudinally traverses said two portions from end to end, means embodied in the upper machine portion to turn peaches moving therealong both in a forward direction and in a transversely rotational direction, finder means carried by the conveyor to find and engage the stem holes of the peaches during the mentioned turning thereof to hold the peaches with their stem holes forwardly directed and to arrest the forward turning movement of the peaches, and orientating means carried by said conveyor to find and enter the stem holes while the same are occupied by the finder means to hold peaches against all rotation during further progress toward discharge, a passage being formed between the mentioned trough sides, the mentioned finder means and orientating means extending through said passage to engage peaches moving along the trough portions, and means carried by the lower steeper portion to retract the finder means.

9. A machine for orientating peaches with the long axes of the stem holes and the seams thereof disposed on a predetermined plane, said machine comprising an upper portion provided with an upper inlet chute and disposed at a downward angle from said chute and a lower portion disposed at a steeper angle and terminating in a lower discharge end, endless conveyor means having a run that longitudinally traverses said two portions from end to end, means embodied in the upper machine portion to turn peaches moving therealong both in a forward direction and in a transversely rotational direction, finder means carried by the conveyor to find and engage the stem holes of the peaches during the mentioned turning thereof to hold the peaches with their stem holes forwardly directed and to arrest the forward turning movement of the peaches, and orientating means carried by said conveyor to find and enter the stem holes while the same are occupied by the finder means to hold peaches against all rotation during further progress toward discharge, means carried by the lower steeper portion to retract the finder means, and means intermediate the ends of the lower sloping portion to divert unoriented peaches from the path of movement thereof toward discharge.

10. In a machine for orientating peaches with the long axes of the stem holes and the seams thereof disposed on a predetermined plane, a sloping trough downwardly along which peaches are adapted to move and to turn forwardly during such movement, means to turn the peaches transversely while they are turning forwardly, finder means moving in advance of each peach to enter the stem hole of said peach when the latter becomes aligned with the finder means, and orientating means moving with the finder means and in advance of the peach to enter said stem hole when the long axis of the same achieves a position in the mentioned plane.

11. In a machine according to claim 10, means to vibrate portions of the trough to impart vibration to the peaches during the engaging of the orientating means in the stem holes.

12. In a machine for orientating peaches with the long axes of the stem holes and the seams thereof disposed on a predetermined plane, a sloping trough downwardly along which peaches are adapted to move and to turn forwardly during such movement, means to turn the peaches transversely while they are turning forwardly, finder means moving in advance of each peach to enter the stem hole of said peach when the latter becomes aligned with the finder means, said finder means comprising a rearwardly directed pin-like member that has its rearward stem hole-entering end sloped at an upward angle to achieve hooking engagement with the walls of the peaches defining the stem holes thereof, and orientating means moving with the finder means and in advance of the peach to enter said stem hole when the long axis of the same achieves a position in the mentioned plane.

13. In a machine for orientating peaches with the long axes of the stem holes and the seams thereof disposed on a predetermined plane, a sloping trough downwardly along which peaches are adapted to move and to turn forwardly during such movement, means to turn the peaches transversely while they are turning forwardly, finder means moving in advance of each peach to enter the stem hole of said peach when the latter becomes aligned with the finder means, said finder means comprising a rearwardly directed pin-like member that has its rearward stem hole-entering end sloped at an upward angle to achieve hooking engagement with the walls of the peaches defining the stem holes thereof, orientating means moving with the finder means and in advance of the peach to enter said stem hole when the long axis of the same achieves a position in the mentioned plane, and a barb on the upper peach-engaging end of said pin-like member to effect slight penetration into the flesh of the peach.

14. In a machine for orientating peaches with the long axes of the stem holes and the seams thereof disposed on a predetermined plane, a sloping trough downwardly along which peaches are adapted to move and to turn forwardly during such movement, means to turn the peaches transversely while they are turning forwardly, finder means moving in advance of each peach to enter the stem hole of said peach when the latter becomes aligned with the finder means, said finder means comprising a rearwardly directed pin-like member that has its rearward stem hole-entering end sloped at an upward angle to achieve hooking engagement with the walls of the peaches defining the stem holes thereof, orientating means moving with the finder means and in advance of the peach to enter said stem hole when the long axis of the same achieves a position in the mentioned plane, a barb on the upper peach-engaging end of said pin-like member to effect slight penetration into the flesh of the peach, and fixed means in the path of movement of the finder means to withdraw the same from the stem holes after peaches have become engaged by the orientating means.

15. In a machine according to claim 14 and in which peaches that are in orientated position have a more forward position on the orientating means than have unorientated peaches, means to divert the latter peaches from the point of discharge of the orientated peaches.

References Cited in the file of this patent

UNITED STATES PATENTS 2,568,947     Carroll _____ Sept. 25, 1951